United States Patent
Chalverat

(10) Patent No.: US 9,353,778 B2
(45) Date of Patent: May 31, 2016

(54) SCREW CONNECTION

(75) Inventor: Raymond Olivier Chalverat, Burg (CH)

(73) Assignee: AMEC SYSTEM GMBH, Bleienbach (CH)

( * ) Notice: Subject to any disclaimer, the term of this patent is extended or adjusted under 35 U.S.C. 154(b) by 0 days.

(21) Appl. No.: 14/111,090

(22) PCT Filed: Apr. 10, 2012

(86) PCT No.: PCT/CH2012/000082
§ 371 (c)(1),
(2), (4) Date: Dec. 6, 2013

(87) PCT Pub. No.: WO2012/139234
PCT Pub. Date: Oct. 18, 2012

(65) Prior Publication Data
US 2014/0082922 A1   Mar. 27, 2014

(30) Foreign Application Priority Data
Apr. 11, 2011   (EP) ..................................... 11405243

(51) Int. Cl.
| F16B 21/00 | (2006.01) |
| F16B 5/02 | (2006.01) |
| F16B 19/02 | (2006.01) |
| F16B 35/06 | (2006.01) |
| F16B 37/14 | (2006.01) |
| F16B 33/00 | (2006.01) |

(52) U.S. Cl.
CPC . *F16B 5/02* (2013.01); *F16B 5/025* (2013.01); *F16B 19/02* (2013.01); *F16B 33/00* (2013.01); *F16B 35/06* (2013.01); *F16B 37/145* (2013.01); *Y10T 29/49948* (2015.01)

(58) Field of Classification Search
None
See application file for complete search history.

(56) References Cited

U.S. PATENT DOCUMENTS

| 2,152,189 | A | | 3/1939 | Henderson |
| 2,632,355 | A | | 3/1953 | Becker |
| 4,033,243 | A | | 7/1977 | Kirrish et al. |
| 4,490,083 | A | * | 12/1984 | Rebish ........................... 411/338 |
| 4,768,322 | A | * | 9/1988 | Kafarowski ................... 411/446 |
| 5,367,774 | A | * | 11/1994 | Labarre ..................... B25B 7/14 30/262 |
| 5,971,334 | A | * | 10/1999 | Crawshaw et al. ........... 411/383 |
| 6,234,734 | B1 | * | 5/2001 | Klippel ............................ 411/42 |
| 7,552,902 | B2 | * | 6/2009 | Tsuge ............................ 248/638 |
| 8,434,982 | B2 | * | 5/2013 | Henriksen, Jr. ......... F16B 37/14 411/338 |
| 2009/0317207 | A1 | * | 12/2009 | Hartmann ..................... 411/353 |

* cited by examiner

*Primary Examiner* — Gary Estremsky
(74) *Attorney, Agent, or Firm* — Birch, Stewart, Kolasch & Birch, LLP

(57) ABSTRACT

A screw connection, in particular for machine construction, special machine construction and plant construction, comprises a first element with an external thread and a first head part, and comprises a second element with an internal thread and a second head part. When the first element is screwed fully into the second element, a surface between the first head part and the second head part is formed as a smooth circular cylinder which is suitable in particular for pinning. In this way, a particularly simple screw connection is created which simultaneously serves for pinning and which is versatile.

19 Claims, 4 Drawing Sheets

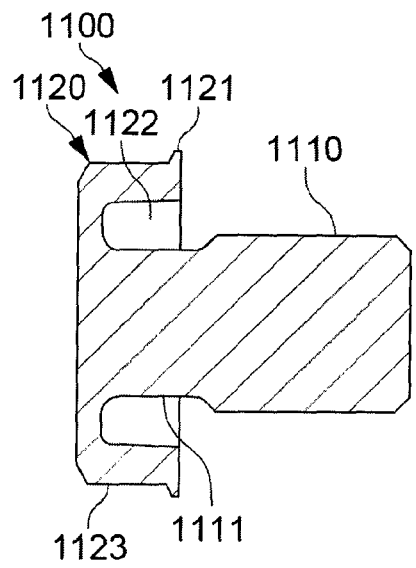
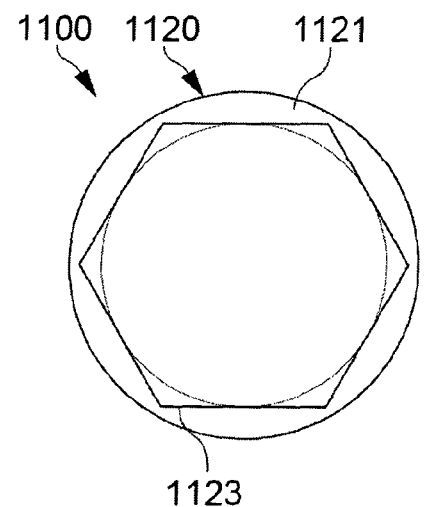
Fig. 1a
Fig. 1b
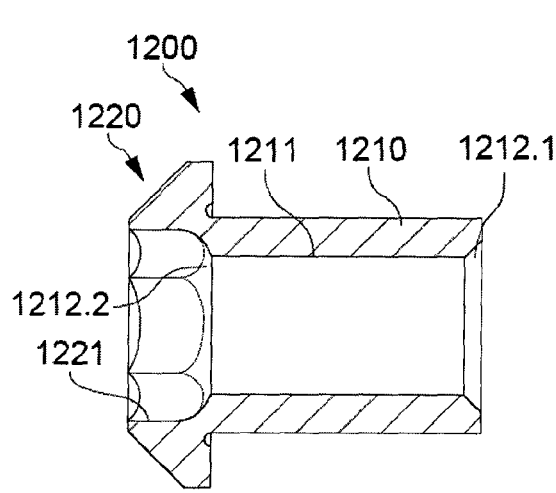
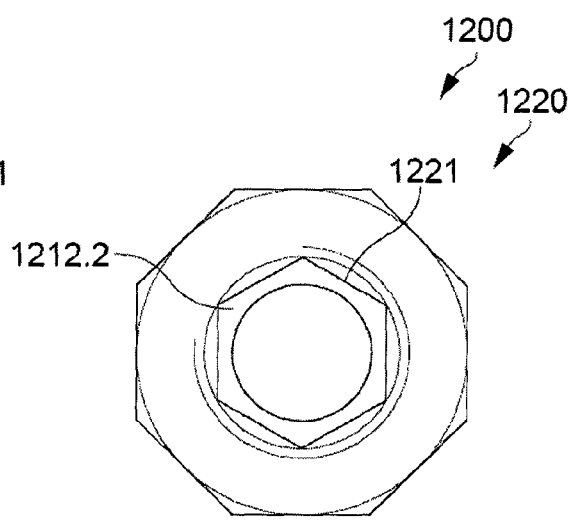
Fig. 2a
Fig. 2b

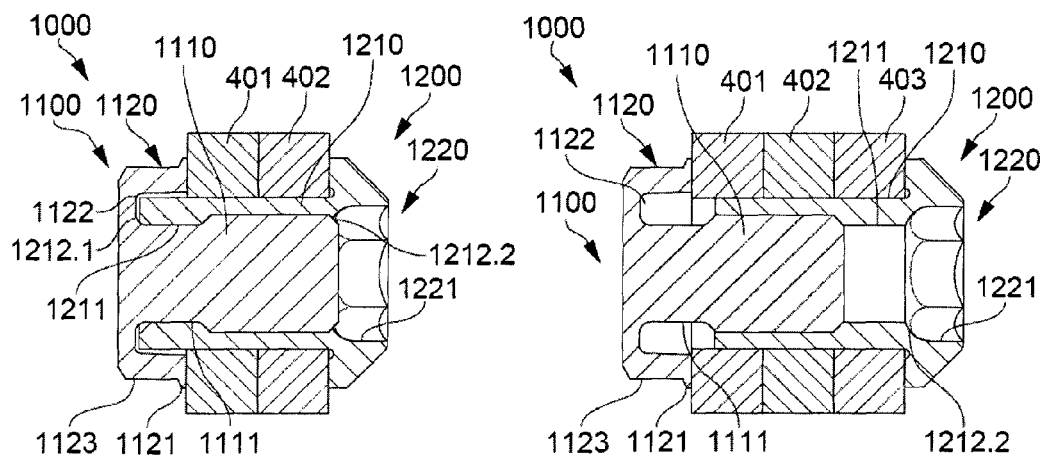
Fig. 3a    Fig. 3b
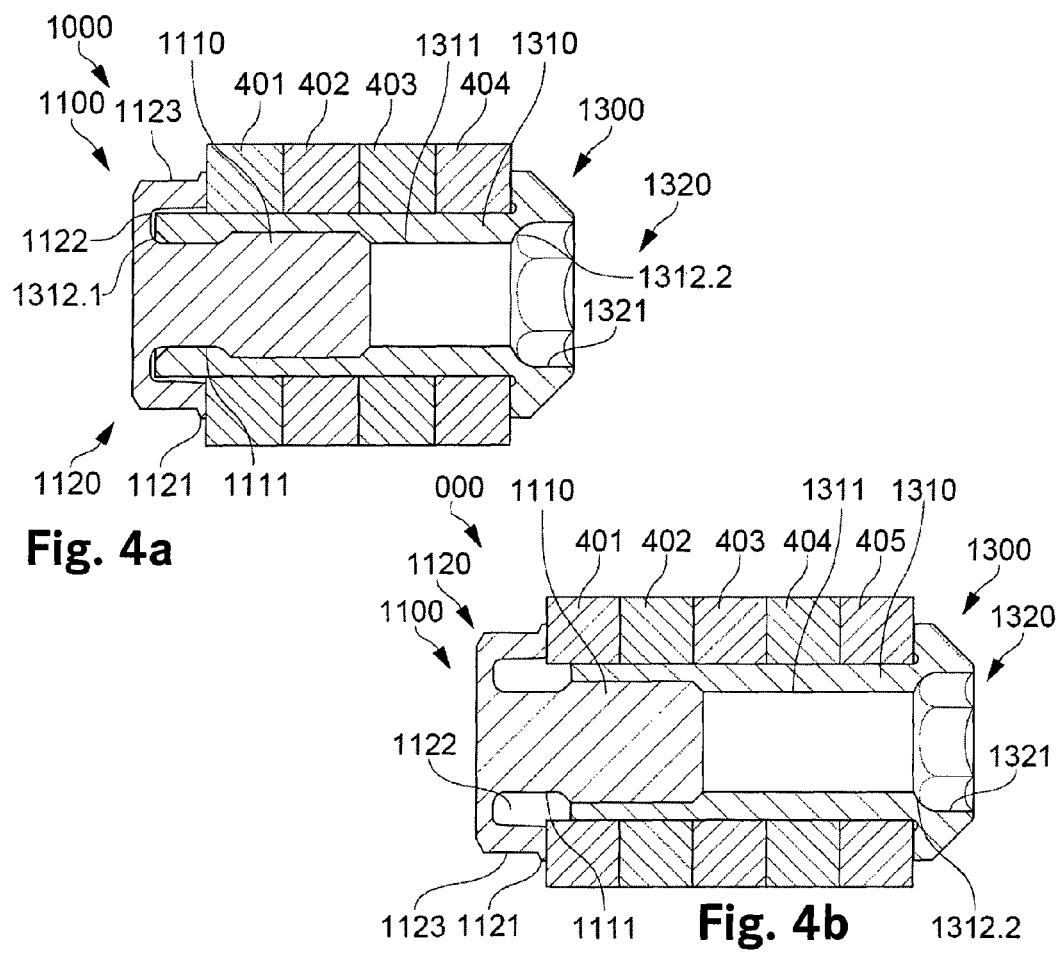
Fig. 4a
Fig. 4b

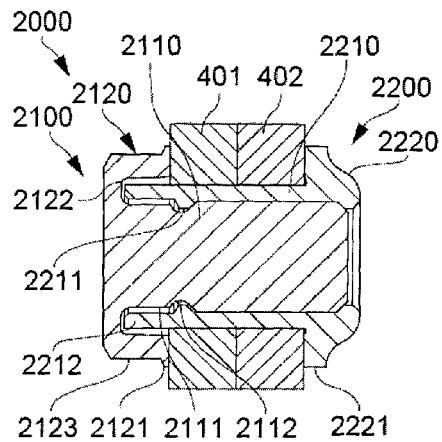
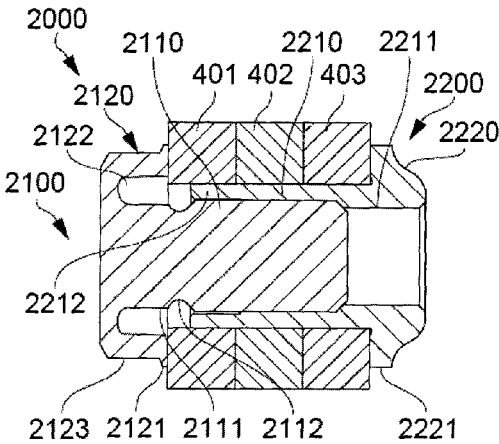
Fig. 7a
Fig. 7b
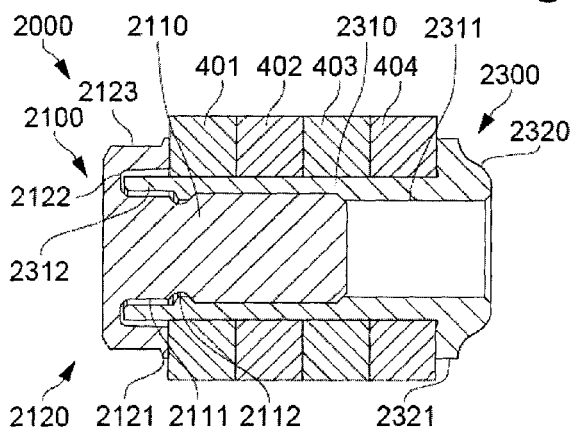
Fig. 8a
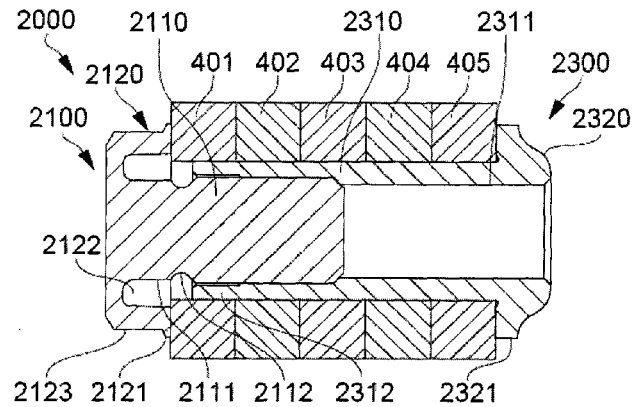
Fig. 8b

SCREW CONNECTION

TECHNICAL FIELD

The invention relates to a screw connection having a first element comprising an external thread and a first head part, and having a second element comprising an internal thread and a second head part.

PRIOR ART

Screw fastening systems comprising a first part with an internal thread and comprising a second part with an external thread are known in a multiplicity of variants. These include not only the normal screw connection by means of a screw and a nut.

U.S. Pat. No. 2,152,189 A (A. Henderson), for example, concerns a steel construction composed of simple and lightweight structural elements for framework construction for houses. The connection of the elements is realized by means of a screw, which is provided over half of its extent with a thread. The nut is likewise provided over only half of its extent with a thread. It is thereby possible for a different number of layers of elements to be screwed together.

In conventional screw fastening systems, there is the risk that radial fixing of elements to be connected cannot be ensured by means of the threaded part. The screw connection disclosed in U.S. Pat. No. 2,152,189 A is not stable with respect to axial forces which act on the elements to be connected, and requires a large amount of space, which is unsatisfactory both from steric and also aesthetic aspects.

PRESENTATION OF THE INVENTION

It is an object of the invention to provide a screw connection which falls within the technical field mentioned in the introduction, which permits a precise and stable connection and is versatile, and which is suitable in particular for machine construction, special machine construction and plant construction.

Said object is achieved by means of the features of Claim 1. According to the invention, when the second element is screwed fully into the second element, a surface between the first head part and the second head part is formed as a smooth circular cylinder which is suitable in particular for pinning.

In this way, a screw connection is created which can absorb both axial forces by means of the screw fastening and also radial forces by means of the pinning, that is to say via the region formed as a smooth circular cylinder. The pinning action however necessitates that the receptacles of the components to be screwed together have a diameter corresponding to the circular cylinder. This is advantageous in particular in structures which require a high degree of precision. In relation to conventional screw fastenings, it is advantageous that the threaded part is not in contact with the elements to be screwed together, with the result that the risk of damage to the threaded part in the region of contact with the elements to be screwed together can be reduced. Furthermore, it is possible in this way for the screw fastening itself to be of more compact design. The threaded part of the first element and that of the second element can therefore be of greater axial length, as a result of which radial and in particular also axial forces can be better absorbed. During use, pinning can be attained already after the insertion of the second element with the internal thread into the receptacles of the components to be connected, in particular before the first element has been screwed in. The construction of a plant is thereby simplified because, as a result of the pinning action imparted by the second element already before the screw fastening process, the radial forces can be absorbed and therefore the radial position, in particular the radial precision, is thus already provided. The internal thread of the second element is preferably arranged coaxially with respect to and within the smooth circular cylinder.

One possible field of application is machine, special machine and plant construction, in which machine elements are joined via a solid structure. Said structures often place high demands on precision, in particular if a structure of said type serves to connect two machines which mechanically interact and thus exert forces, for example vibrations, on the structure. The screw connection according to the invention is however not restricted to plant construction but rather may be used in all fields where a precise screw connection may be advantageous. A non-exhaustive list here includes vehicle construction, structure construction, machine construction, special machine construction, appliance construction etc.

Below, the expression "axial" is used in each case to denote an axis which runs coaxially with the axis of a threaded part, in particular of an internal or external thread. The expression "radial" is to be understood in each case to mean perpendicular to the axis.

It is preferable if the first element can be screwed with the second element axially into at least two positions, wherein the spacing between the first head part and the second head part is greater in the first axial position than in the second axial position. In this way, it is for example possible for three components of the same thickness to be screwed together in the first position, and for two such components to be screwed together in the second axial position. It is also possible for more than three components to be screwed together in the first axial position and for more than two components to be screwed together in the second axial position. In particular, the screw fastening may also take place in more than two axial positions; typically the spacing between the head parts can be varied continuously between the maximum and the minimum spacing. In particular in the first axial position, the surface between the first head part and the second head part need not imperatively be formed entirely as a smooth circular cylinder. The external thread, or a part which adjoins the external thread and which is situated between the head part and the threaded part, of the first element may also project in regions out of the smooth circular cylinder and, in said region, have a smaller diameter than the circular cylinder. In said region, the component is not supported radially. This is not a problem in particular if the component which comes to rest in said region is at least partially held radially by the smooth circular cylinder. Said region preferably has, with respect to the component, an axial length of at most approximately one third of the axial length of the receptacle of the component, such that the component is nevertheless adequately held radially, and the pinning is ensured.

The external thread of the first element and the internal thread of the second element are preferably not of conical design, in order to be able to realize both axial positions.

The spacing in the first axial position is preferably at least 100/n percent greater than in the second axial position, wherein n is equal to three or four. In other words, the spacing in the first axial position is preferably at least 25% greater, in particular at least 33% greater, than in the second axial position.

If n is equal to three, it is possible in the first axial position for three components to be held which have a thickness corresponding to half of the spacing in the second axial position. Accordingly, precisely two such components can be held in the second axial position.

If n is equal to four, it is possible in the first axial position for five components to be held which have a thickness corresponding to one quarter of the spacing in the second axial position. Accordingly, precisely four such components can be held in the second axial position.

The underlying concept now lies in the fact that the second element can be provided in two embodiments in order to screw together components of thickness d. In the case of the first embodiment, the axial spacing in the second position equals 2 d, and the second axial spacing of the second embodiment is 4 d. In this way, it is achieved that, with the first embodiment, either two or three components can be screwed together, and with the second embodiment, four or five components can be screwed together. During use, one component may also be formed merely as a spacer sleeve in order to create a connection to an axially offset further component.

It is clear to a person skilled in the art that the same principle can also be applied for n equals five etc., whereby for example in the case of n equals five, six components can be held in the first axial position, and five components can be held in the second axial position. The basic principle is to be understood as generic.

In a preferred embodiment, in a first axial screw fastening position, three or five layers respectively, in particular layers which all have the same thickness, are held between the first head part and the second head part, and in a second axial screw fastening position, two or four layers respectively are held between the first head part and the second head part, wherein in each case, all of the layers are held radially by means of the smooth circular cylinder.

The first element is preferably formed as a cap screw. The head part of the first element is thereby formed as a cap of the cap screw. It is thereby possible for the forces exerted in the corresponding axial direction to be absorbed via the cap of the cap screw. The cap has a contact region for a tightening tool, such that the screw connection can be tightened via the cap of the cap screw (see further below).

In variants, the first element may also be of some other design, wherein preferably the head part has a radially greater cross section than the threaded part.

The external thread part preferably comprises an encircling groove adjacent to the first head part. It is thereby possible, in the second axial position, for a part of the smooth circular cylinder to be received in the groove. Furthermore, it is made possible in this way that, in both axial positions, the components can be held axially between the head parts without additional elements, while the pinning remains ensured. For this purpose, the groove has an outer diameter which substantially corresponds, in particular as a function of the admissible length tolerance of the diameter, to the outer diameter of the smooth circular cylinder. The inner diameter corresponds approximately to the outer diameter of the external thread of the first element. It is thereby ensured that the internal thread can be screwed into the groove.

The groove is U-shaped in cross section, wherein the opening is oriented in the axial direction, in particular in the direction of the thread.

In variants, it is also possible to dispense with the encircling groove. In this case, washers or spacer sleeves could ensure the axial fixing of the components.

The groove preferably has an axial depth in the range of less than 50% or less than 25% of the spacing between the first head part and the second head part in the fully screwed-in state. The depth of the groove is less than 50% in the first embodiment, and less than 25% in the second embodiment, of the spacing between the head parts in the fully screwed-in state. Since, for the radial support, it is not necessary for the component to be completely held laterally by the smooth circular cylinder, it is sufficient for the groove to have a depth of less than 50% or less than 25%, respectively, of the above-mentioned spacing. With the axial depth of the groove, it is possible to reach a compromise between axial extent of the screw fastening and radial support of the component bearing against the first head part. Depending on material selection and field of use, it may be adequate for the depth of the groove to be approximately ⅔ of the component thickness, as a result of which, in the screwed-together state, the component which makes contact with the first head component makes contact, in the first axial position, with the smooth circular cylinder over two thirds of an inner surface of the receptacle.

In principle, the groove may also have a greater axial depth. It would thereby be possible for a spacing between the two head parts to be varied over a greater range, wherein however the axial overall length of the head part of the first element would be greater.

The sleeve nuts may also be designed such that a spacing between the two head parts in the second axial position is substantially zero in a first embodiment, corresponds to the axial depth of the groove in a second embodiment, and corresponds to twice the axial depth of the groove in a third embodiment, etc. In this way, a screw fastening system is created which can be used independently of the thickness of the components to be screwed together, and which is in particular suitable for any thickness to be encompassed by the screw fastening.

The external thread part preferably has a narrowing in the region of the groove. The external thread of the first element need not project into the groove but rather may merge, before the head part, into a smooth region which however has a diameter which corresponds to or is slightly smaller than the diameter of the external thread of the first element minus twice the thread depth. This can simplify the production of the cap screw. The first element and the second element are advantageously formed such that, in any axial position in which components are held, the external thread lies entirely in the internal thread of the second element.

The thread may alternatively also project into the groove.

The head part of the first element preferably comprises a hexagon head. It is achieved in this way that relatively high torques can be exerted on the first element using a conventional torque wrench, as a result of which the stability of the screw connection is increased.

In variants, use may be made of external square heads, hexagon socket heads, Torx heads or further screw heads known to a person skilled in the art. Preferable, however, are screw heads on which a high torque can be exerted.

The head part of the first element preferably has, in a side facing towards the threaded part, a cross-sectional area with a greater diameter than a cross-sectional area of the hexagon head. The side facing towards the threaded part is preferably furthermore in the form of a circular ring. In this way, friction during tightening can be kept low, in particular because only sliding friction can occur through the interaction with the component. This is advantageous if the elements to be connected are produced from slightly resilient or deformable material, because the pressing-in and turning of a non-circular element (for example a screw head which has a hexagonal contact surface) results in a massive increase in rotational resistance, and furthermore, the component may even be damaged through chip removal. The enlarged cross-sectional area furthermore has the advantage that the head part can be better supported on the component, as a result of which the forces acting on the components can be better absorbed. It is furthermore advantageous that a stop for the torque wrench can be realized in this way. This may be of benefit to the plant constructors in particular at poorly accessible locations. The cross-sectional area need not imperatively be in the form of a circular ring, but rather may also have an external shape of a hexagon, or other shapes.

In variants, the enlarged cross-sectional area may also be omitted.

The second element is preferably formed as a sleeve nut, wherein the sleeve is formed as a smooth circular cylinder, which is in particular suitable for pinning, and has an internal thread. The internal thread is preferably formed coaxially with respect to the sleeve. The head part preferably has a greater diameter than the sleeve, such that said head part can also serve for fixing the components axially. The head part may be formed as a screw head or as a radially outwardly projecting edge of the sleeve.

The second head part preferably comprises a hexagon socket head and/or a polygonal outer contour, in particular an octagonal contour. In this way, the second element can be fixed in a simple manner, during the tightening of the screw connection, by means of an Allen key or an open-ended wrench.

In variants, the second head part may also have any other desired shape, for example a hexagon, hexagonal socket or other screw head shapes known to a person skilled in the art. Furthermore, the second head part may also be formed without a shaped portion for a torque wrench, wherein said head part may have for example a square, rectangular or any desired polygonal shape, such as for example a parallelogram shape, which can be secured against rotation in a groove.

The interior space of the hexagon socket head preferably communicates with the interior space of the internal thread.

Alternatively, a continuous opening in the second element may also be dispensed with.

The first and/or the second element are preferably formed from rust-resistant steel. This is advantageous in particular if a particularly high degree of precision is required and the screw connection is subjected to high loads.

In variants, it is possible, in particular as a function of the field of use, for other materials known to a person skilled in the art, such as for example aluminium or brass, to be used for the first and the second element.

It is preferable if the second element is inserted, during use, through openings of at least two layers, in particular layers formed as elements for plant construction, and the first element is screwed by means of the external thread into the internal thread of the second element, wherein the layers are held radially relative to one another by means of the smooth circular cylinder and are held axially relative to one another by means of the first and the second head part. Since the first element is inserted through openings in the layers or components first, radial fixing of the components, or pinning of the components, can be attained already before the screw fastening takes place. In this way, it is achieved that the plurality of components have substantially the definitive radial orientation already when the first element is inserted into the openings, and said components cannot be displaced radially when the second element is screwed in.

In a preferred embodiment, the diameter of the smooth circular cylinder is 6.5 mm or 10.5 mm and has an H tolerance of preferably 7 or 8. The spacing between the head parts in the second axial position may be for example 6 mm or 10 mm respectively in the first, shorter embodiment of the sleeve nut, and 12 mm or 20 mm respectively in the second, longer embodiment of the sleeve nut.

In variants, other diameters of the smooth circular cylinder, other tolerances and other spacings between the head parts are also conceivable.

Further advantageous embodiments and combinations of features of the invention will emerge from the following detailed description and from the entirety of the claims.

BRIEF DESCRIPTION OF THE DRAWINGS

In the drawings used for explaining the exemplary embodiment:

FIG. 1a shows a sectional illustration along a longitudinal axis of a cap screw of the first embodiment;

FIG. 1b shows a schematic plan view of the head part of the cap screw as per FIG. 1a;

FIG. 2a shows a sectional illustration along a longitudinal axis of a short sleeve nut of the first embodiment;

FIG. 2b shows a schematic plan view of the cap of the sleeve nut as per FIG. 2a;

FIG. 3a shows a sectional illustration along a longitudinal axis through a screw connection of the first embodiment with a short sleeve nut in the second axial position, wherein two components are screwed together;

FIG. 3b shows a sectional illustration along a longitudinal axis through a screw connection of the first embodiment with a short sleeve nut in the first axial position, wherein three components are screwed together;

FIG. 4a shows a sectional illustration along a longitudinal axis through a screw connection of the first embodiment with a long sleeve nut in the second axial position, wherein four components are screwed together; and FIG. 4b shows a sectional illustration along a longitudinal axis through a screw connection of the first embodiment with a long sleeve nut in the first axial position, wherein five components are screwed together.

FIG. 5b shows a schematic plan view of the head part of the cap screw as per FIG. 5a;

FIG. 6b shows a schematic plan view of the cap of the sleeve nut as per FIG. 6a;

FIG. 7a shows a sectional illustration along a longitudinal axis through a screw connection of the second embodiment with a short sleeve nut in the second axial position, wherein two components are screwed together;

FIG. 7b shows a sectional illustration along a longitudinal axis through a screw connection of the second embodiment with a short sleeve nut in the first axial position, wherein three components are screwed together;

FIG. 8a shows a sectional illustration along a longitudinal axis through a screw connection of the second embodiment with a long sleeve nut in the second axial position, wherein four components are screwed together; and FIG. 8b shows a sectional illustration along a longitudinal axis through a screw connection of the second embodiment with a long sleeve nut in the first axial position, wherein five components are screwed together.

Identical components are basically denoted by the same reference numerals in the figures.

WAYS OF IMPLEMENTING THE INVENTION

Figure 5A:
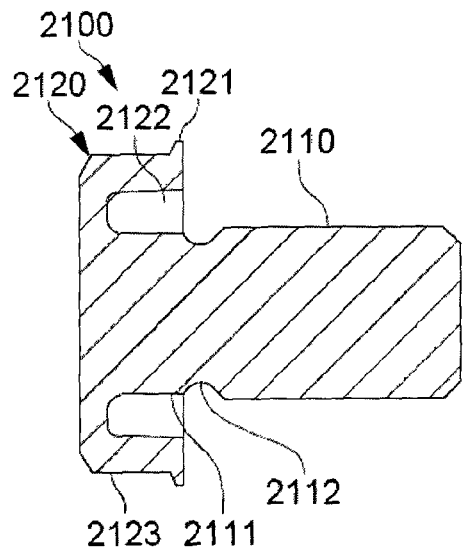
FIG. 5a shows a sectional illustration along a longitudinal axis of a cap screw of the second embodiment.

In the figures described below, the cap screw 1100 and the sleeve nut 1200 of the first embodiment are shown in each case without a thread in order to be able to better highlight the essential features.

FIG. 1 shows a sectional illustration along a longitudinal axis of a cap screw 1100 of the first embodiment, comprising a threaded part 1110 and a cap 1120. The threaded part 1110 has substantially the shape of a circular cylinder. The thread of the threaded part 1110 has a thread axis in the plane of the figure. The threaded part 1110 is oriented coaxially with respect to the cap 1120. The thread of the threaded part 1110 does not project as far as the cap 1120 but rather merges into a narrowing 1111. The difference in radially measured diameter between the region of the thread and the narrowing 1111 corresponds approximately to the thread depth. The cap 1120 has substantially the shape of a straight cylinder which is closed on one side and which has a hexagonal base surface which serves as an external hexagon as a contact region for a torque wrench. The cap 1120 and the threaded part are now oriented and connected such that the perpendicular bisector of the hexagon runs coaxially with the axis of the threaded part 1110. The cap screw 1100 comprises a substantially U-shaped groove 1122, wherein the opening of the U shape is aligned axially. Here, a region of the narrowing 1111 which faces towards the cap 1120 forms an inner flank of the U shape, and the outer flank is formed by the inner wall of the cap 1120. The cap 1120 has, in the side facing towards the threaded part 1110, a radially outwardly projecting flange 1121.

FIG. 1*b* shows a schematic plan view of the cap 1120 of the cap screw 1100 as per FIG. 1*a*. Here, the external hexagon 1123 and the flange 1121 can be seen. In the present first embodiment, the external hexagon 1123 has roundings in the edge region axially opposite the flange 1121, which roundings can facilitate the engagement of a torque wrench.

FIG. 2*a* shows a sectional illustration along a longitudinal axis of a sleeve nut 1200 of the first embodiment, the axially shorter form. The sleeve nut 1200 comprises a sleeve 1210 with an internal thread 1211 and a shoulder 1220 connected coaxially to the sleeve 1210. The sleeve has, in the edge region at both sides, bevels 1212.1, 1212.2 of the inner edges, which bevels firstly symbolize the transition to the internal thread and secondly, in particular at the edge opposite the shoulder 1220, are intended to simplify the insertion of the cap screw 1100. The shoulder 1220 has a hexagon socket 1221 which merges via the bevel 1212.2 into the interior space of the sleeve 1210. By means of the bevel 1212.2, it is then achieved that a hexagonal wrench (Allen key) cannot pass into the threaded region, which could cause damage to the thread.

FIG. 2*b* shows a schematic plan view of the shoulder 1220 of the sleeve nut 1200 as per FIG. 2*a*. The head part has substantially an octagonal shape which, on the side opposite the sleeve 1210, has the shape of a circular truncated cone. By means of the octagonal shape, the sleeve nut 1200 can be rotationally secured during the screw fastening process. Formed within and coaxially with respect to the circular truncated cone is the hexagon socket 1221 which merges via the bevel 1212.2 into the internal thread 1211.

FIG. 3*a* shows a sectional illustration along a longitudinal axis through a screw connection 1000 of the first embodiment with a short sleeve nut 1200 in the second axial position, wherein two components 401, 402 are screwed together. The components 401 have circular cylindrical openings. The sleeve nut 1200 is guided through the openings. The cap screw 1100 is subsequently screwed with the threaded part 1110 into the internal thread 1211 of the sleeve 1210 of the sleeve nut 1200. For this purpose, a hexagonal wrench, for example a torque-regulated wrench, is used to screw the cap screw 1100 in, and an Allen key is to counter-hold the sleeve nut 1200. During the screwing-in process, the sleeve 1210 moves with the region situated opposite the shoulder 1220 into the groove 1122 of the cap 1120 of the cap screw 1100. Here, the screw connection 1000 is designed such that, in the screwed-in and tightened state, the foremost region of the sleeve 1210 does not quite make contact with the cap 1120, such that the axial pressure acts substantially via the cap 1120 and the shoulder 1220 on the components 401, 402.

FIG. 3*b* shows a sectional illustration along a longitudinal axis through a screw connection 1000, substantially as per FIG. 3*a*, wherein the sleeve nut 1200 is in the first axial position and wherein three components 401-403 are screwed together. In contrast to FIG. 3*a*, the sleeve 1210 does not project into the groove 1122 of the cap screw 1100 but rather projects only as far as the end of the thread of the cap screw 1100. The thread of the cap screw is therefore, as in the second axial position, entirely in contact with the internal thread 1211 of the sleeve nut 1200.

FIGS. 4*a* and 4*b* show a sectional illustration along a longitudinal axis through a screw connection of the first embodiment with a long sleeve nut 1300 in the second axial position, wherein four components 401-404 or five components 401-405, respectively, are screwed together. The principle is basically identical to that shown in FIGS. 3*a* and 3*b*. The contrast with respect to FIGS. 3*a* and 3*b* lies in the fact that the long sleeve nut 1300 is formed so as to be longer than twice the thickness of a component 401 provided, such that instead of two or three components 401, 402, it is now possible for four or five components 401-405 to be screwed together. The head part of the long sleeve nut 1300 is identical to the head part of the short sleeve nut 1200. Correspondingly, in the figures, 'one thousand three hundred' numbers are used instead of 'one thousand two hundred' numbers.

In the following figures, the cap screw 2100 and the sleeve nut 2200 of the second embodiment are described with regard to the differences in relation to the cap screw 1100 and the sleeve nut 1200 of the first embodiment. Again, the threads are not illustrated in order to be able to better highlight the essential features.

FIG. 5*a* shows a sectional illustration along a longitudinal axis of a cap screw 2100 of the second embodiment. Said cap screw differs from the cap screw 1100 of the first embodiment substantially in that the narrowing 2111 has approximately a diameter which corresponds to the diameter of the threaded part 2110. Between the narrowing 2111 and the threaded part 2110 there is provided an encircling notch 2112 which has a smaller diameter than the narrowing 2111.

Figure 5B:
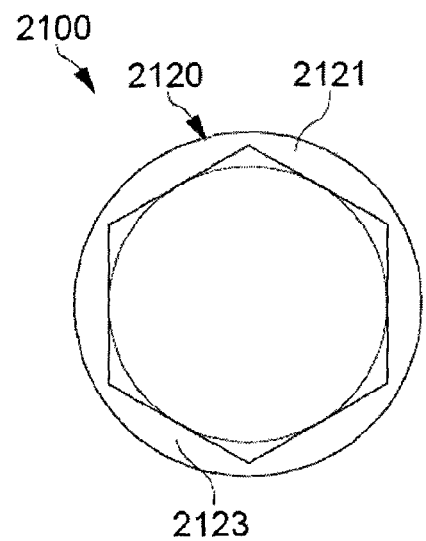

FIG. 5*b* shows a schematic plan view of the head part 2120 of the cap screw as per FIG. 5*a*, which does not differ from the plan view as per FIG. 1*b*.

Figure 6A:
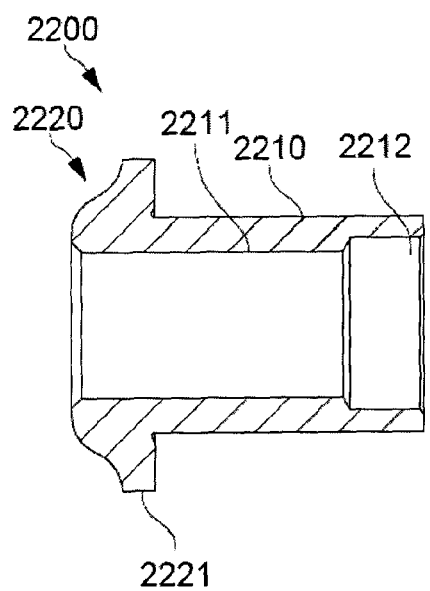
FIG. 6a shows a sectional illustration along a longitudinal axis of a short sleeve nut of the second embodiment.

FIG. 6*a* shows a sectional illustration along a longitudinal axis of a short sleeve nut 2200 of the second embodiment. Said sleeve nut differs from the sleeve nut 1200 of the first embodiment in that a hexagon socket is not provided, but rather the internal thread 2211 extends through the head part. At the end opposite the head part, an undercut 2212 is provided in the inner wall. The sleeve nut 2200 has a greater inner diameter in the region of the undercut 2212 than in the region of the internal thread 2211.

Figure 6B:
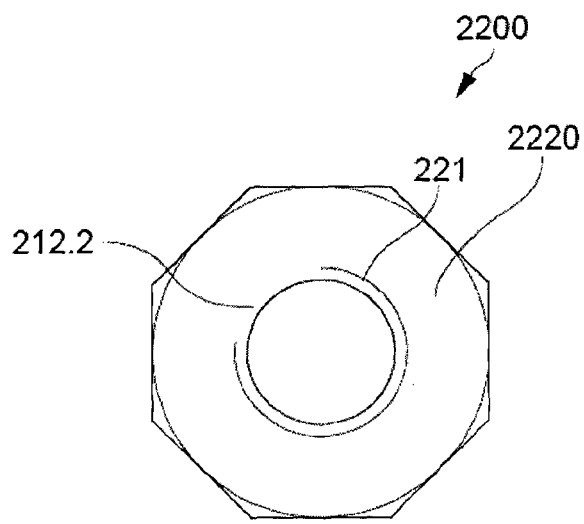

FIG. 6*b* shows a schematic plan view of the head of the sleeve nut 2200 as per FIG. 6*a*, wherein in comparison with the sleeve nut 1200, only the hexagon socket has been omitted. The present sleeve nut 2200 is therefore held fixed by means of the octagonal outer contour 2321, for example using a wrench, during the screw fastening process.

FIGS. 7*a*, 7*b*, 8*a* and 8*b* show in each case a sectional illustration along a longitudinal axis through a screw connection 2000 of the second embodiment corresponding to FIGS.

3a, 3b, 4a, 4b, wherein in contrast, the sleeve nuts 2200 and 2300 respectively and the cap screw 2100 according to the second embodiment are used.

In summary, it can be stated that, according to the invention, a particularly simple screw connection is created which simultaneously serves for pinning and which is versatile.

The invention claimed is:

1. Screw connection for machine construction, special machine construction and plant construction, having
    a first element comprising an external thread part and a first head part, wherein the first head part comprises an encircling groove adjacent to the external thread part, and having
    a second element comprising an internal thread and a second head part,
    characterized in that, when the first element is screwed fully into the second element, a surface between the first head part and the second head part is formed as a smooth circular cylinder for pinning, and
    wherein in a second axial position, a part of the smooth circular cylinder is received in the groove.

2. Screw connection according to claim 1, wherein the first element can be screwed with the second element axially into at least two positions, wherein the spacing between the first head part and the second head part is greater in the first axial position than in the second axial position.

3. Screw connection according to claim 2, wherein the spacing in the first axial position is at least 25% greater than in the second axial position.

4. Screw connection according to claim 1, wherein the first element is formed as a cap screw.

5. Screw connection according to claim 1, wherein the groove has an axial depth in the range of less than 50% of the spacing between the first head part and the second head part in the fully screwed-in state.

6. Screw connection according to claim 1, wherein the first element comprises a narrowing adjacent to the external throated part in the groove.

7. Screw connection according to claim 1, wherein the head part of the first element has a hexagon head.

8. Screw connection according to claim 7, wherein the head part of the first element has, in a side facing towards the threaded part, a cross-sectional area with a greater diameter than a diameter of a cross-sectional area of the hexagon.

9. Screw connection according to claim 1, wherein the second element is formed as a sleeve nut, wherein the sleeve is formed as a smooth circular cylinder, which is suitable for pinning, and has an internal thread.

10. Screw connection according to claim 1, wherein the second head part comprises a hexagon socket head and/or a polygonal outer contour.

11. Screw connection according to claim 10, wherein the interior space of the hexagon socket head communicates with the interior space of the internal thread.

12. Screw connection according to claim 10, wherein the second head part comprises a hexagon socket head and an octagonal outer contour.

13. Screw connection according to claim 1, wherein the first element and/or the second element are formed from rust-resistant steel.

14. Use of a screw connection according to claim 1, comprising steps of:
    inserting the second element through openings of at least two layers; and
    screwing the first element by means of the external thread into the internal thread of the second element, wherein the layers are held radially relative to one another by means of the smooth circular cylinder and are held axially relative to one another by means of the first and the second head parts.

15. Use according to claim 14, further comprising holding in a first axial screw fastening position three or five layers respectively between the first head part and the second head part or holding in a second axial screw fastening position two or four layers respectively between the first head part and the second head part, wherein in each case, all of the layers are held radially by means of the smooth circular cylinder.

16. Screw connection according to claim 14, wherein the surface between the first head part and the second head part is suitable for pinning.

17. Use of a screw connection according to claim 14, by inserting the second element through openings of at least two layers formed as elements for plant construction.

18. Screw connection according to claim 3, wherein the spacing in the first axial position is at least 33% greater, than in the second axial position.

19. Screw connection for machine construction, special machine construction and plant construction, having a first element comprising an external thread and a first head part, wherein the first head part comprises an encircling groove adjacent to the external thread part, and having a second element comprising an internal thread and a second head part, characterized in that when the first element is screwed fully into the second element, a surface between the first head part and the second head part is formed as a smooth circular cylinder, and wherein in the second axial position, a part of the smooth circular cylinder is received in the groove, and wherein the groove has an axial depth in the range of 25% and 50% of the spacing between the first head part and the second head part in the fully screwed-in state.

* * * * *